(12) United States Patent
Sugitani et al.

(10) Patent No.: US 10,245,699 B2
(45) Date of Patent: *Apr. 2, 2019

(54) VALVE SEAT MACHINING DEVICE, AND VALVE SEAT MACHINING METHOD USING SAID VALVE SEAT MACHINING DEVICE

(71) Applicant: MITSUBISHI HITACHI POWER SYSTEMS, LTD., Kanagawa (JP)

(72) Inventors: Daichi Sugitani, Kanagawa (JP); Takahiro Matsumoto, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/325,268

(22) PCT Filed: Jun. 15, 2016

(86) PCT No.: PCT/JP2016/067723
§ 371 (c)(1),
(2) Date: Jan. 10, 2017

(87) PCT Pub. No.: WO2016/204158
PCT Pub. Date: Dec. 22, 2016

(65) Prior Publication Data
US 2017/0182624 A1    Jun. 29, 2017

(30) Foreign Application Priority Data
Jun. 16, 2015   (JP) .................................. 2015-120763

(51) Int. Cl.
*B24B 15/03*    (2006.01)
*B24B 15/04*    (2006.01)
(Continued)

(52) U.S. Cl.
CPC .............. *B24B 15/04* (2013.01); *B23B 41/12* (2013.01); *B23C 3/056* (2013.01); *B23P 6/00* (2013.01)

(58) Field of Classification Search
CPC .......... B23C 3/05–3/056; Y10T 408/00; Y10T 408/04; Y10T 408/33; Y10T 408/31;
(Continued)

(56) References Cited

U.S. PATENT DOCUMENTS 2,026,821 A * 1/1936 Cleveland ................. B23C 3/05
                                                                    408/83.5
2,283,323 A * 5/1942 Erhardt .................... B23B 3/265
                                                                    409/179
(Continued)

FOREIGN PATENT DOCUMENTS

JP    53-28892      3/1978
JP    55-151401    10/1980
(Continued)

OTHER PUBLICATIONS

English translation of JP H09-192998.*
(Continued)

*Primary Examiner* — Jun S Yoo
(74) *Attorney, Agent, or Firm* — Wenderoth, Lind & Ponack, L.L.P.

(57) ABSTRACT

A valve seat processing machine configured to process a valve seat in a valve device including a valve body portion which forms a flow passage of fluid and a valve drive portion which drives a valve element capable of tightly engaging with the valve seat includes: a base portion attached to the valve body portion; a main body portion movable relative to the base portion; a support portion movable relative to the main body portion in a drive direction of the valve element; a main spindle rotatable relative to the support portion about (Continued)

an axis parallel to the drive direction of the valve element; a tool holder configured to hold a tool for processing the valve seat and movable relative to the main spindle in a direction intersecting the drive direction of the valve element; and a controller configured to control movement of the support portion and the tool holder.

3 Claims, 6 Drawing Sheets

(51) Int. Cl.
  *B23B 41/12* (2006.01)
  *B23C 3/05* (2006.01)
  *B23P 6/00* (2006.01)
(58) Field of Classification Search
  CPC ........... Y10T 408/356; Y10T 408/5612; Y10T 408/5617; Y10T 408/56245; Y10T 408/56253; Y10T 408/5626–408/5628; Y10T 408/564–408/5653; Y10T 408/675–408/6793; Y10T 408/83; Y10T 408/86; Y10T 408/8929; Y10T 408/03; Y10T 408/558–408/5584; Y10T 29/49306; Y10T 29/49233; Y10T 29/49409; Y10T 409/306384; B23P 6/00; B23P 15/001; F16K 1/42; F16K 1/34; B23Q 17/2233; B23Q 17/225; B23Q 17/2266; B23Q 17/2275; B23Q 17/2283; B24B 15/00; B24B 15/02; B24B 15/04; B24B 15/08; B24B 15/03
  See application file for complete search history.

(56) References Cited

U.S. PATENT DOCUMENTS

| | | | | |
|---|---|---|---|---|
| 2,318,854 | A | * | 5/1943 | Hall ........................ B24B 15/00 451/431 |
| 3,522,758 | A | * | 8/1970 | Minelli ................... B23C 3/055 126/298 |
| 5,030,046 | A | * | 7/1991 | Ricci ....................... B23C 3/051 408/75 |
| 5,829,928 | A | * | 11/1998 | Harmand ................ B23C 3/055 408/109 |
| 5,967,007 | A | | 10/1999 | Scheer |

FOREIGN PATENT DOCUMENTS

| | | |
|---|---|---|
| JP | 61-99402 | 6/1986 |
| JP | 4-244301 | 9/1992 |
| JP | 3021143 | 2/1996 |
| JP | 9-192998 | 7/1997 |
| JP | 11-500966 | 1/1999 |
| JP | 3359038 | 12/2002 |
| JP | 2006-239836 | 9/2006 |
| JP | 2007-118117 | 5/2007 |
| JP | 2014-214709 | 11/2014 |

OTHER PUBLICATIONS

English translation of JP H04-244301.*
Extended European Search Report dated May 16, 2017 in corresponding European patent application No. 16 81 1632.
International Search Report dated Jul. 12, 2016 in International Application No. PCT/JP2016/067723.
Office Action dated Sep. 14, 2015 in corresponding Japanese patent application No. 2015-120763 (with English translation).

* cited by examiner

VALVE SEAT MACHINING DEVICE, AND VALVE SEAT MACHINING METHOD USING SAID VALVE SEAT MACHINING DEVICE

TECHNICAL FIELD

The present invention relates to a valve seat processing machine which performs repair processing on a valve seat in a valve device used to supply fluid to a turbine when the valve seat is eroded, and to a valve seat processing method using the valve seat processing machine.

BACKGROUND ART

For example, in power generation equipment utilizing a steam turbine, heat energy of steam generated by a boiler is converted into mechanical work by the steam turbine, and a valve device is provided between the boiler and the steam turbine. The valve device forms a flow passage of the steam (fluid) fed from the boiler to the steam turbine, and opens and closes the flow passage by operating a valve element and bringing it in tight contact with part (valve seat) of an inner wall of the flow passage.

This valve device has a problem that the steam flowing from the boiler into the valve device (flow passage) hits the inner wall of the valve device as jet (see Patent Document 1). The steam hitting the inner wall of the flow passage causes pressure loss of the valve device and also causes erosion of the inner wall. Particularly, when the valve seat is eroded, a flow of steam flowing along the valve seat into the steam turbine may be disturbed.

PRIOR ART DOCUMENT

Patent Document

Patent Document 1: Japanese Patent Application Publication No. 2014-214709

SUMMARY OF THE INVENTION

Problems to be Solved by the Invention

When the valve seat is eroded as described above, repair processing needs to be performed on the valve seat. The repair processing is processing of cutting a surface of the valve seat to remove an eroded portion and reprocessing the valve seat into a shape corresponding to the valve element.

The repair processing of the valve seat is performed by moving the valve device from a plant (power generation plant) where the power generation equipment is located to a plant (processing plant) where processing equipment is located. Specifically, the valve device is removed from a portion between the boiler and the steam turbine, transported from the power generation plant to the processing plant, and subjected to the repair processing in the processing plant. Then, the valve device subjected to the repair processing is transported from the processing plant to the power generation plant and attached between the boiler and the steam turbine again.

As described above, the repair processing of the valve seat in the valve device requires removal and attachment work of the valve device, transport work between the plants, and processing work with the processing equipment, and requires a large cost and long time.

The present invention has been made in view of the problems described above, and an object of the present invention is to facilitate repair processing of a valve seat in a valve device used to supply fluid to a turbine.

Means for Solving the Problems

A valve seat processing machine according to a first aspect of the present invention for solving the problems described above is a valve seat processing machine configured to process a valve seat in a valve device including a valve body portion which forms a flow passage of fluid and a valve drive portion which is detachably provided on the valve body portion and which opens and closes the flow passage by driving a valve element capable of tightly engaging with the valve seat in the valve body portion, characterized in that the valve seat processing machine comprises: a base portion configured to be attached to the valve body portion; a main body portion provided on the base portion and movable relative to the base portion in two different axial directions; a support portion provided on the main body portion and movable relative to the main body portion in a drive direction of the valve element; a main spindle provided on the support portion and rotatable relative to the support portion about an axis parallel to the drive direction of the valve element; a tool holder provided on the main spindle and configured to hold a tool for processing the valve seat, the tool holder being movable relative to the main spindle in a direction intersecting the drive direction of the valve element; and a controller configured to control movement of the support portion and the tool holder.

A valve seat processing machine according to a second aspect of the present invention for solving the problems described above is the valve seat processing machine according to the first aspect, characterized in that the base portion has as many bolt insertion holes as existing bolt holes provided in the valve body portion, the bolt insertion holes being provided at the same pitch as the bolt holes.

A valve seat processing machine according to a third aspect of the present invention for solving the problems described above is the valve seat processing machine according to the first or second aspect, characterized in that the valve seat processing machine further comprises a ring member rotatably attached to an outer periphery of the main spindle and fixable to the valve body portion.

A valve seat processing machine according to a fourth aspect of the present invention for solving the problems described above is the valve seat processing machine according to any one of the first to third aspects, characterized in that the main body portion includes pressing means for pressing the base portion to form a gap between the main body portion and the base portion.

A valve seat processing method according to a fifth aspect of the present invention for solving the problems described above is a valve seat processing method of processing a valve seat in a valve device including a valve body portion which forms a flow passage of fluid and a valve drive portion which is detachably provided on the valve body portion and which opens and closes the flow passage by driving a valve element capable of tightly engaging with the valve seat in the valve body portion, characterized in that the valve seat processing method comprises processing the valve seat into a shape corresponding to the valve element by removing the valve drive portion from the valve body portion, attaching the valve seat processing machine according to any one of the first to fourth aspects to the valve body portion, attaching a cutting tool to the tool holder, moving the support portion in the drive direction of the valve element, and moving the tool holder in the direction intersecting the drive direction of the valve element.

Effect of the Invention

The valve seat processing machine according to the first aspect of the present invention can be attached to the valve body portion of the valve device in place of the valve drive portion when the valve seat of the valve device is eroded. Accordingly, the repair processing of the valve seat can be performed with the valve device (valve body portion) attached to a turbine and the like. Hence, in the repair processing of the valve seat in the valve device, it is possible to eliminate work of removing the valve device from the turbine and the like, work of attaching the valve device to the turbine and the like, and work of transporting the valve device between a plant where power generation equipment is located and a plant where processing equipment is located.

In the valve seat processing machine according to the second aspect of the present invention, the valve seat processing machine is provided with as many bolt insertion holes as the existing bolt holes provided in the valve device, at the same pitch as the bolt holes in the valve device. Accordingly, the valve seat processing machine can be attached to the valve device with the phase of the valve seat processing machine shifted in a unit of the pitch of the bolt holes. In other words, the attachment direction of the valve seat processing machine relative to the valve device can be changed. Hence, when there is another device (peripheral structures and the like) near the valve device, it is possible to attach the valve seat processing machine to the valve device while avoiding interference with the other device.

In the valve seat processing machine according to the third aspect of the present invention, the ring member can be fixed to the valve body portion while allowing rotation of the main spindle. Hence, it is possible to prevent shaking (vibration and pitching) of the main spindle caused by processing resistance and the like generated in the processing.

In the valve seat processing machine according to the fourth aspect of the present invention, it is possible to form a gap between the main body portion and the base portion by using the pressing means and insert a height adjustment liner into the gap (between the main body portion and the base portion). Hence, the tilt of the main body portion (main spindle) relative to the base portion can be adjusted by, for example, inserting the height adjustment liner on one end side of the main body portion and lifting the main body portion only on the one end side.

In the valve seat processing method according to the fifth aspect of the present invention, the valve seat processing machine can be attached to the valve body portion of the valve device in place of the valve drive portion when the valve seat of the valve device is eroded. Accordingly, the repair processing of the valve seat can be performed with the valve device (valve body portion) attached to a turbine and the like. Hence, in the repair processing of the valve seat in the valve device, it is possible to eliminate work of removing the valve device from the turbine and the like, work of attaching the valve device to the turbine and the like, and work of transporting the valve device between a plant where power generation equipment is located and a plant where processing equipment is located.

Moreover, the valve seat can be easily processed into the shape corresponding to the valve element by controlling the movement of the support portion and the tool holder and processing the valve seat with the cutting tool.

MODE FOR CARRYING OUT THE INVENTION

An embodiment of a valve seat processing machine in the present invention is described below in detail with reference to the attached drawings. As a matter of course, the present invention is not limited to the following embodiment, and various changes can be made within the scope not departing from the spirit of the present invention.

Embodiment 1

A structure of a valve device subjected to a repair processing using a valve seat processing machine in Embodiment 1 of the present invention is described with reference to FIG. 7.

Figure 7:
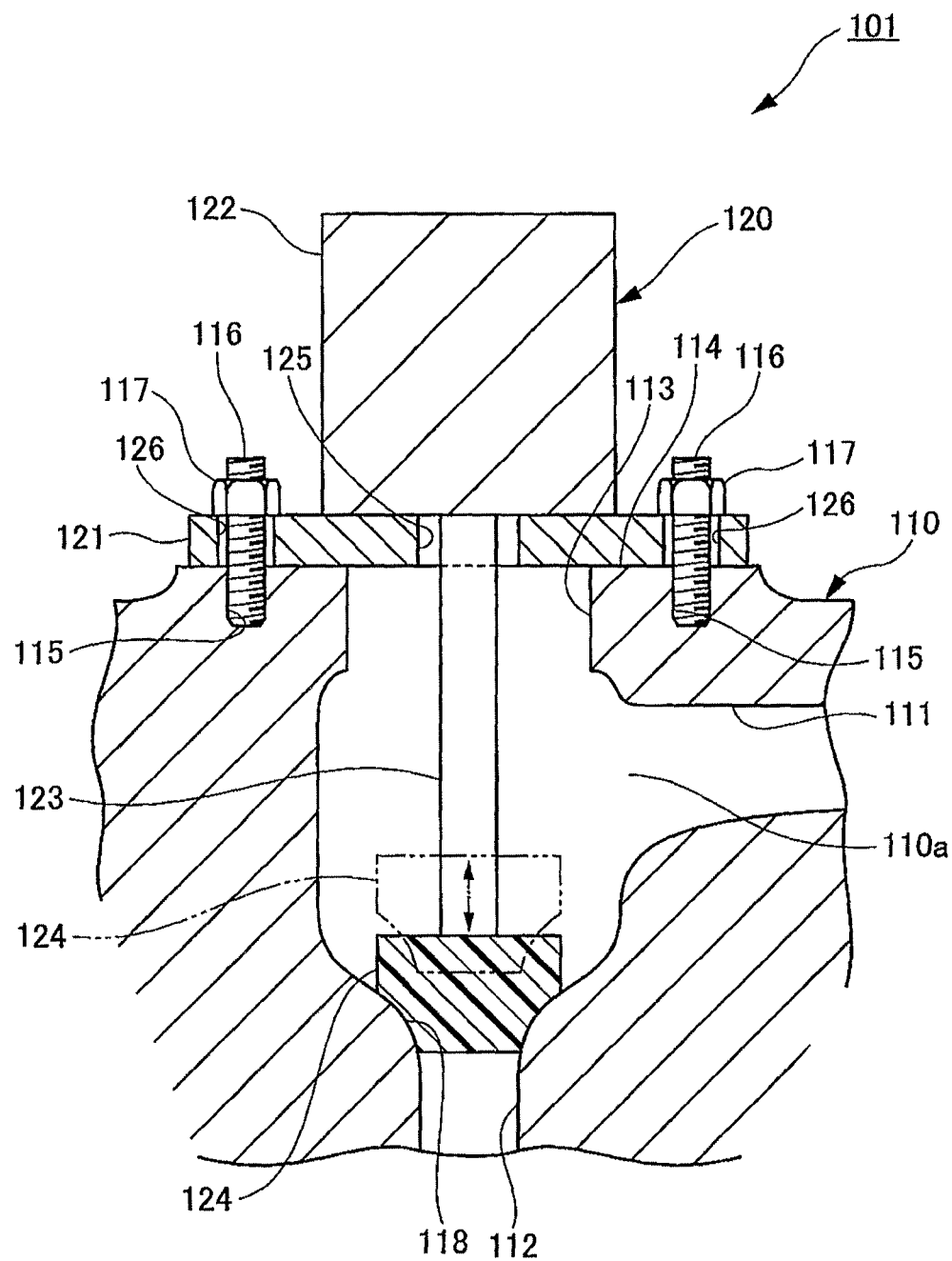
FIG. 7 is a cross-sectional view illustrating a structure of a valve device subjected to repair processing using the valve seat processing machine in Embodiment 1.

As illustrated in FIG. 7, a valve device 101 includes a valve body portion 110 which forms a flow passage 110*a* of steam and a valve drive portion 120 which is detachably provided on the valve body portion 110 and which operates a valve element 124 to be described later such that the valve element 124 opens and closes the flow passage 110*a* in the valve body portion 110. The valve device 101 is provided between a not-illustrated boiler and a not-illustrated steam turbine in power generation equipment. The valve body portion 110 forms the flow passage 110*a* through which steam supplied from the boiler to the steam turbine flows, and the valve drive portion 120 stops the flow of steam in the flow passage 110*a* and adjusts the flow rate of steam flowing through the flow passage 110*a*.

The valve body portion 110 is provided with a first opening portion 111 opening to one side (right side in FIG. 7) in a horizontal direction, a second opening portion 112 opening to one side (lower side in FIG. 7) in a vertical direction, and a third opening portion 113 opening to the other side (upper side in FIG. 7) in the vertical direction. In the valve body portion 110, the first opening portion 111 is connected to the not-illustrated boiler, and the second opening portion 112 is connected to the not-illustrated steam turbine. The steam generated in the not-illustrated boiler flows into the valve device 101 (valve body portion 110) via the first opening portion 111 and then flows out to the not-illustrated steam turbine via the second opening portion 112. In other words, the flow passage 110a communicating with the first opening portion 111 and the second opening portion 112 is formed in the valve body portion 110.

The third opening portion 113 is formed to communicate with the flow passage 110a and be opposed to the second opening portion 112. Moreover, the third opening portion 113 is formed to be opened on an upper surface 114 of the valve body portion 110. The upper surface 114 on which the third opening portion 113 is opened is a processed surface processed to be flat. The valve drive portion 120 in the valve device 101 is attached to the upper surface 114 of the valve body portion 110.

The valve drive portion 120 includes an attachment plate 121 which is fixed to the valve body portion 110 (upper surface 114), a drive portion main body 122 which is provided on the attachment plate 121 and has a not-illustrated drive source, and a valve stem 123 and the valve element 124 which are operated in one direction (vertical direction which is an up-down direction in FIG. 7) by the drive portion main body 122.

Multiple bolt holes 115 are formed near the third opening portion 113 on the upper surface 114 of the valve body portion 110, and stud bolts 116 are screwed to these bolt holes 115, respectively. Meanwhile, in the attachment plate 121 of the valve drive portion 120, a valve stem insertion hole 125 in which the valve stem 123 can be inserted is formed at a position corresponding to the third opening portion 113 of the valve body portion 110, and bolt insertion holes 126 in which the stud bolts 116 can be inserted are formed at positions corresponding to the bolt holes 115 and the stud bolts 116 of the valve body portion 110.

The stud bolts 116 on the upper surface 114 (valve body portion 110) are inserted into the bolt insertion holes 126 of the attachment plate 121 (valve drive portion 120), and nuts 117 are screwed to the stud bolts 116 from front ends thereof to fix the attachment plate 121 (valve drive portion 120) to the upper surface 114 (valve body portion 110). Note that the multiple bolt holes 115 and the multiple stud bolts 116 in the valve body portion 110 are provided to surround the third opening portion 113 and be away from one another by a predetermined distance in a circumferential direction (see FIG. 1). Moreover, the multiple bolt insertion holes 126 in the valve drive portion 120 are provided to correspond to the bolt holes 115 and the stud bolts 116, that is, provided to surround the valve stem insertion hole 125 and be away from one another by the predetermined distance in the circumferential direction (as many bolt insertion holes 126 as the bolt holes 115 and the stud bolts 116 are provided at the same pitch as the bolt holes 115 and the stud bolts 116) (see FIG. 7).

The drive portion main body 122 is fixed to the attachment plate 121 by not-illustrated fixing means. The valve stem 123 is provided to be inserted in the valve stem insertion hole 125 of the attachment plate 121 from the drive portion main body 122 and protrude downward. The valve element 124 is attached to the front end side (lower end side in FIG. 7) of the valve stem 123.

The valve stem 123 and the valve element 124 are operated in the axial direction of the valve stem 123 (up-down direction in FIG. 7) by the not-illustrated drive source of the drive portion main body 122. A valve seat 118 having a shape corresponding to the valve element 124 is provided in the second opening portion 112 of the valve body portion 110, and the valve element 124 is tightly engaged with the valve seat 118 by the operation of the valve drive portion 120. The valve element 124 tightly engaged with the valve seat 118 closes the flow passage 110a in the valve body portion 110 and the flow of steam from the not-illustrated boiler to the not-illustrated steam turbine is stopped.

A structure of the valve seat processing machine in Embodiment 1 of the present invention is described with reference to FIGS. 1 to 5.

Figure 1:
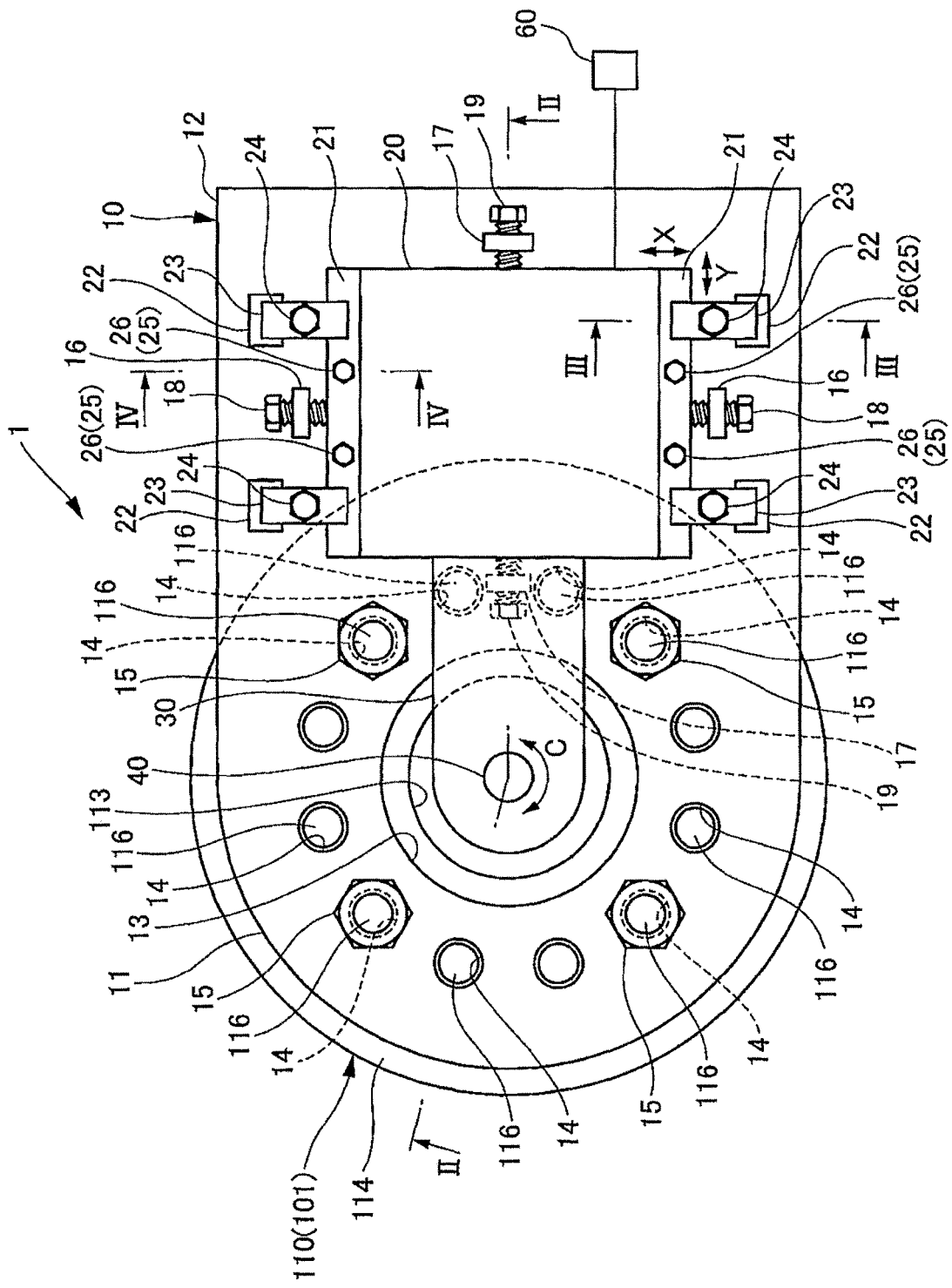
FIG. 1 is a plan view illustrating a structure of a valve seat processing machine in Embodiment 1.
Figure 2:
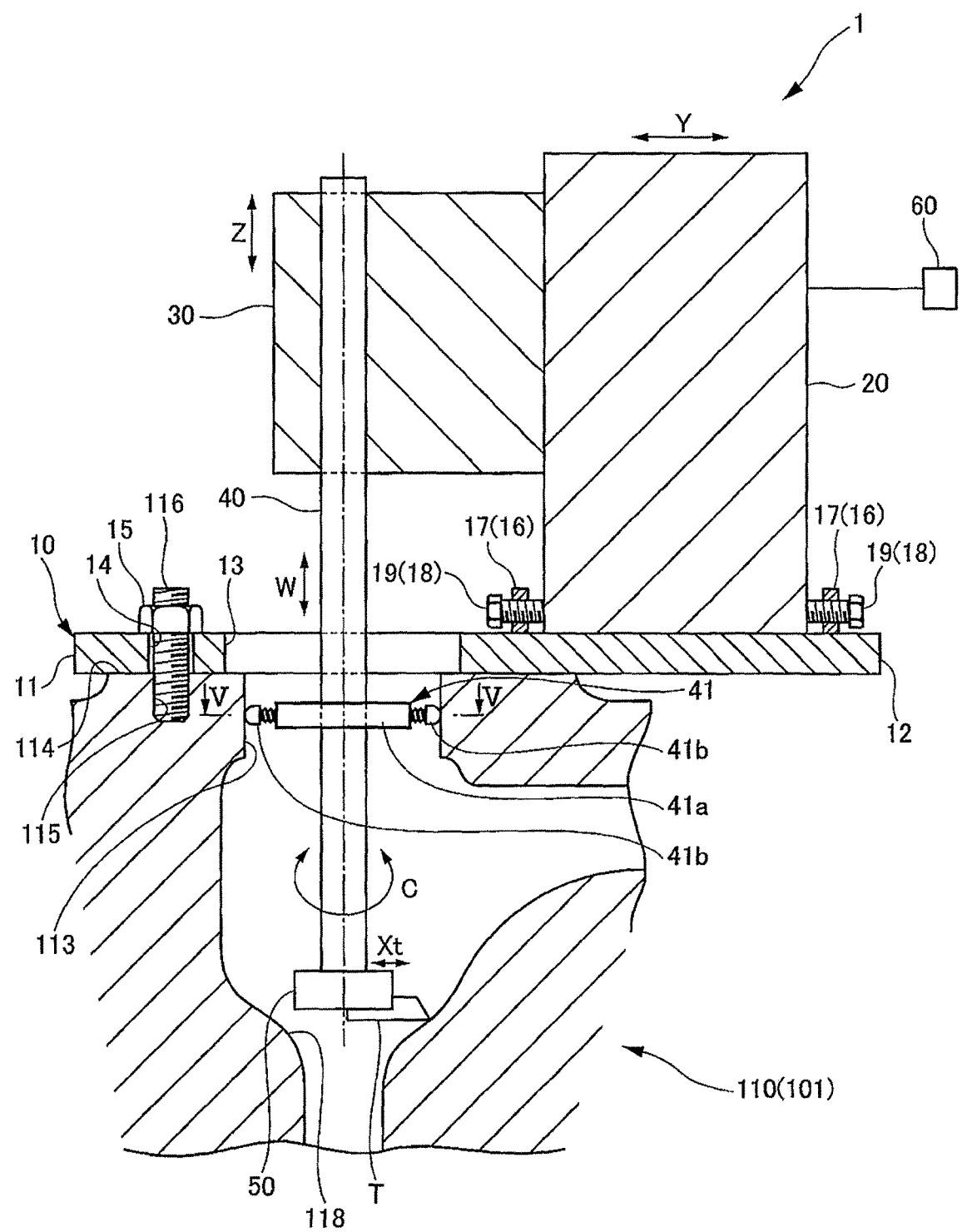
FIG. 2 is a cross-sectional view (cross-sectional view along the line II-II in FIG. 1 viewed in the direction of arrows) illustrating a structure of the valve seat processing machine in Embodiment 1.

As illustrated in FIGS. 1 and 2, a valve seat processing machine 1 roughly includes: a base portion 10 fixed to the valve body portion 110 of the valve device 101; a main body portion 20 provided on the base portion 10 to be movable relative to the base portion 10 in a horizontal X-axis direction (up-down direction in FIG. 1) and a horizontal Y-axis direction (left-right direction in FIGS. 1 and 2); a support portion 30 extending in one horizontal direction (leftward in FIGS. 1 and 2) from the main body portion 20 to be movable relative to the main body portion 20 in a vertical Z-axis direction (up-down direction in FIG. 2); a main spindle 40 provided on a front end side (left end side in FIGS. 1 and 2) of the support portion 30 and supported to be movable relative to the support portion 30 in a vertical W-axis direction (up-down direction in FIG. 2) and to be rotatable relative to the support portion 30 about a vertical C axis; a tool holder 50 provided in a front end portion (lower end portion in FIG. 2) of the main spindle 40 and holding a cutting tool T, the tool holder 50 being movable relative to the main spindle 40 in an Xt-axis direction (left-right direction in FIG. 2) intersecting the vertical direction; and an NC device 60 capable of controlling the movement of the support portion 30 in the Z-axis direction, the movement of the main spindle 40 in the W-axis direction, the rotation of the main spindle 40 about the C axis, and the movement of the tool holder 50 in the Xt-axis direction.

The valve seat processing machine 1 is used to perform repair processing on the valve seat 118 of the valve device 101 when the valve seat 118 is eroded, and is attached to the valve body portion 110 of the valve device 101 in place of the valve drive portion 120 (see FIG. 7). Specifically, the valve seat processing machine 1 is movable and can perform repair processing on the valve seat 118 with the valve device 101 (valve body portion 110) attached to the not-illustrated boiler and the not-illustrated steam turbine.

As illustrated in FIGS. 1 and 2, the base portion 10 of the valve seat processing machine 1 has a flat shape obtained by combining a circular portion 11 and a rectangular portion 12 (see FIG. 1). The base portion 10 is fixed to the valve body portion 110 of the valve device 101 in the circular portion 11, and the main body portion 20 of the valve seat processing machine 1 is fixed to the base portion 10 in the rectangular portion 12 (see FIGS. 1 and 2).

The circular portion 11 of the base portion 10 is provided with a main spindle through hole 13 (having substantially the same diameter as the third opening portion 113 and having a larger diameter than the third opening portion 113 in FIGS. 1 and 2) in which the main spindle 40 can be inserted and multiple (12 in FIG. 1) bolt through holes 14 in which the stud bolts 116 can be inserted. The main spindle through hole 13 is formed at a position corresponding to the third opening portion 113, and the multiple bolt through holes 14 are provided at positions corresponding to the bolt holes 115 and the stud bolts 116 of the valve device 101, that is, provided to surround the main spindle through hole 13 and be away from one another by a predetermined distance in the circumferential direction (as many bolt through holes 14 as the bolt holes 115 and the stud bolts 116 are provided at the same pitch as the bolt holes 115 and the stud bolts 116).

The stud bolts 116 of the valve body portion 110 in the valve device 101 are inserted into the bolt through holes 14 of the base portion 10 in the valve seat processing machine 1 and nuts 15 are screwed to the stud bolts 116 from the front ends thereof to fix the base portion 10 (valve seat processing machine 1) to the valve body portion 110 (valve device 101).

Since the valve seat processing machine 1 (base portion 10) is provided with as many bolt through holes 14 as the multiple stud bolts 116 in the valve device 101 at the same pitch as the stud bolts 116, the stud bolts 116 of the valve device 101 can be inserted into the bolt through holes 14 of the base portion 10 when the valve seat processing machine 1 is turned relative to the valve device 101 by one pitch (or multiple pitches). Accordingly, the base portion 10 (valve seat processing machine 1) can be attached to the valve body portion 110 (valve device 101) with the pitch of the base portion 10 being shifted in a unit of one pitch. By making the attachment direction of the valve seat processing machine 1 to the valve device 101 variable as described above, the valve seat processing machine 1 can be attached to the valve device 101 (valve body portion 110) while avoiding interference with another not-illustrated device (peripheral structure) when such a device exists near the valve device 101.

Figure 3:
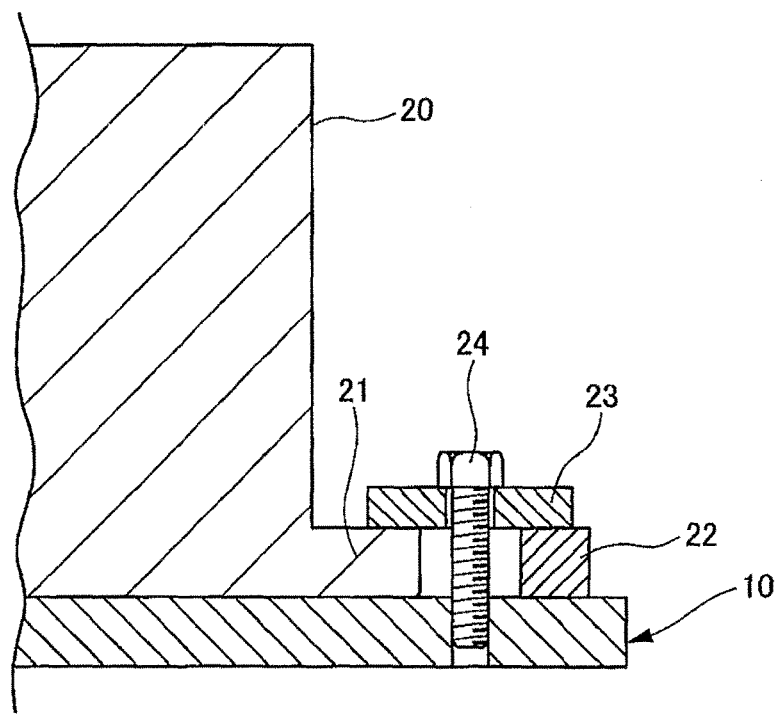
FIG. 3 is an explanatory view (cross-sectional view along the line III-III in FIG. 1 viewed in the direction of arrows) illustrating a method of fixing a base portion and a main body portion in the valve seat processing machine in Embodiment 1.

As illustrated in FIGS. 1 and 3, the main body portion 20 of the valve seat processing machine 1 is provided with flanges 21 at symmetric positions (on upper and lower sides in FIG. 1). The flanges 21 are held down, together with liners 22 formed substantially at the same height (length in the up-down direction in FIG. 3) as the flanges 21, by hold-down fittings 23 and bolts 24, and the main body portion 20 is thereby fixed to the base portion 10.

As illustrated in FIGS. 1 and 2, the base portion 10 is provided with protruding portions 16, 17 located around (on four sides in FIG. 1) the main body portion 20. X-axis direction position adjustment bolts 18 are screwed to the protruding portions 16 located on both sides (upper and lower sides in FIG. 1) of the main body portion 20 in the horizontal X-axis direction, and the main body portion 20 can be moved in the X-axis direction on the base portion 10 by turning the X-axis direction position adjustment bolts 18. Y-axis direction position adjustment bolts 19 are screwed to the protruding portions 17 located on both sides (left and right sides in FIG. 1) of the main body portion 20 in the horizontal Y-axis direction, and the main body portion 20 can be moved in the Y-axis direction on the base portion 10 by turning the Y-axis direction position adjustment bolts 19. In other words, the position of the main body portion 20 relative to the base portion 10 in the horizontal plane (X-Y plane) can be adjusted by using the X-axis direction position adjustment bolts 18 and the Y-axis direction position adjustment bolts 19.

Figure 4:
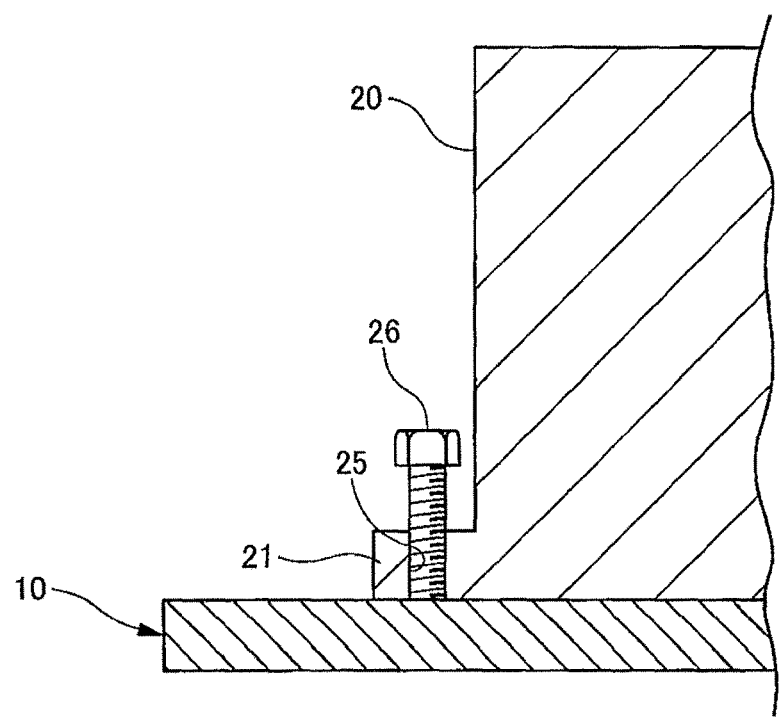
FIG. 4 is an explanatory view (cross-sectional view along the line IV-IV in FIG. 1 viewed in the direction of arrows) illustrating pressing means in the valve seat processing machine in Embodiment 1.

Moreover, as illustrated in FIGS. 1 and 4, multiple (four in FIG. 1) screw holes 25 penetrating the flanges 21 in the vertical direction (up-down direction in FIG. 4) are formed in the main body portion 20, and lifting bolts 26 are screwed into the screw holes 25. The main body portion 20 can be lifted from the base portion 10, that is, a gap can be formed between the base portion 10 and the main body portion 20 by screwing the lifting bolts 26 into the flanges 21. A not-illustrated height adjustment liner can be inserted in the gap (between the base portion 10 and the main body portion 20) by lifting the main body portion 20 and forming a gap between the base portion 10 and the main body portion 20 as described above. Specifically, the tilt of the main body portion 20 relative to the base portion 10 (tilt of the main spindle 40 relative to the vertical direction) can be adjusted by inserting the not-illustrated height adjustment liner on one end side of the main body portion 20 and lifting only the one end side of the main body portion 20.

Making the X-axis direction position, Y-axis direction position, and tilt of the main body portion 20 relative to the base portion 10 fixed to the valve device 101 adjustable as described above enables accurate processing in which the main spindle 40 is aligned with the center of the valve seat 118. Note that, by using the liners 22, the hold-down fittings 23, and the bolts 24 to fix the main body portion 20 to the base portion 10, the main body portion 20 can be fixed to the base portion 10 with the X-axis direction position, the Y-axis direction position, and the tilt being adjusted.

Figure 5:
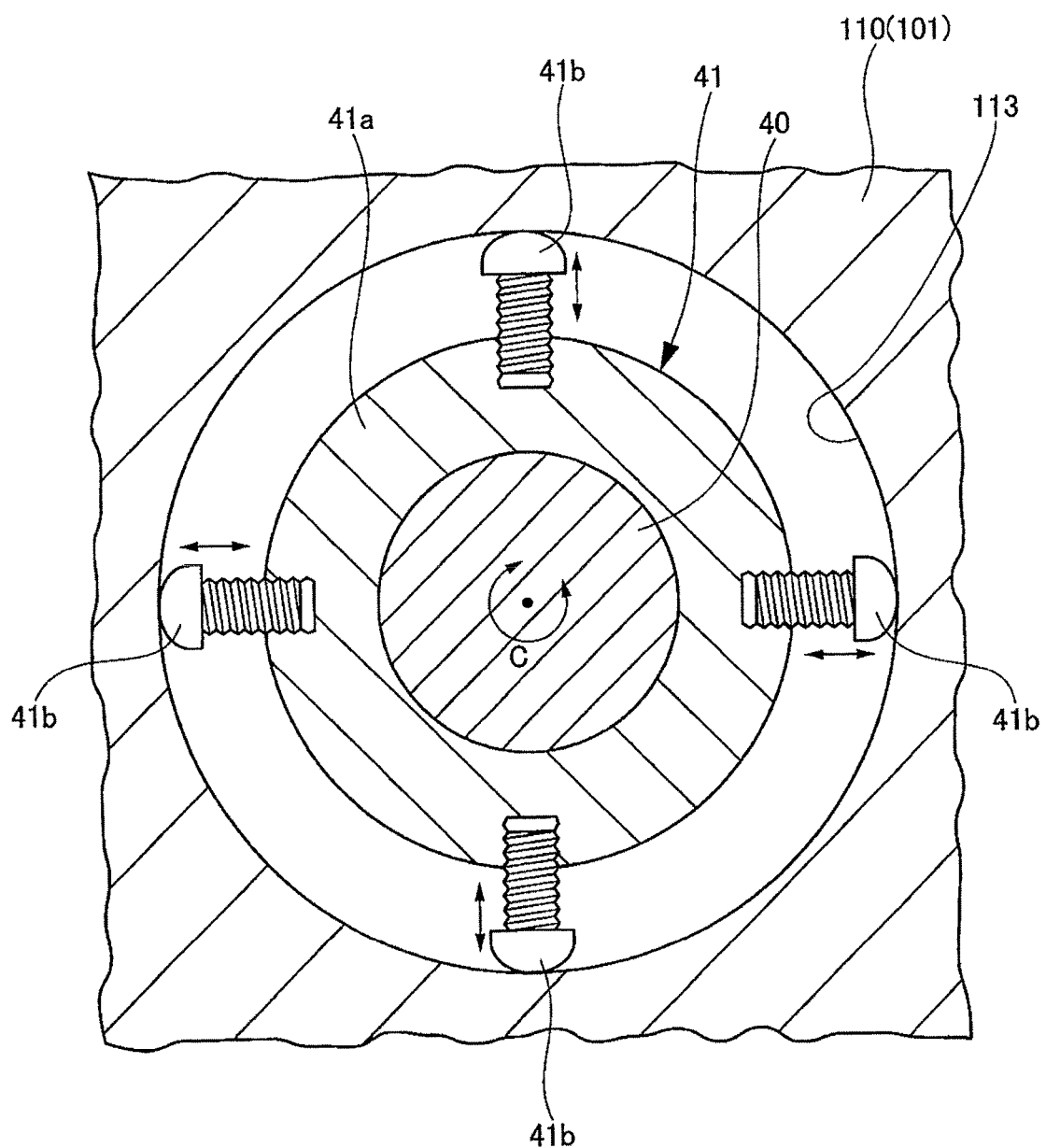
FIG. 5 is an explanatory view (cross-sectional view along the line V-V in FIG. 2 viewed in the direction of arrows) illustrating an anti-vibration ring in the valve seat processing machine in Embodiment 1.

As illustrated in FIGS. 2 and 5, the main spindle 40 is provided with a rotatably-supported anti-vibration ring 41. The anti-vibration ring 41 can prevent shaking (vibration and pitching) of the main spindle 40 caused by processing resistance and the like when the processing is performed by the cutting tool T provided at the front end of the main spindle 40, and includes a ring portion 41a having an inner diameter which is substantially the same as (slightly larger than) the outer diameter of the main spindle 40 and multiple (four in FIG. 5) protruding bolts 41b capable of protruding outward from the ring portion 41a. The protruding amounts of the protruding bolts 41b from the ring portion 41a are adjusted by turning the protruding bolts 41b, and the anti-vibration ring 41 is thereby fixed to, for example, the inside of the third opening portion 113 while allowing rotation of the main spindle 40 about the C axis.

A valve seat processing method using the valve seat processing machine in Embodiment 1 of the present invention is described with reference to FIGS. 1 to 7.

When erosion occurs in the valve device 101 due to drive of the not-illustrated boiler and the not-illustrated steam turbine, the following repair work is performed while the drive of the boiler and the steam turbine is stopped (in regular inspection or the like).

First, the valve drive portion 120 attached to the valve body portion 110 of the valve device 101 is removed (see FIG. 7), and the valve seat processing machine 1 is attached to the valve body portion 110 of the valve device 101, in place of the valve drive portion 120 (see FIG. 2). Specifically, the base portion 10 in the processing machine 1 is fixed to the valve body portion 110 of the valve device 101 by inserting the stud bolts 116 installed in the valve body portion 110 into the bolt through holes 14 of the base portion 10 and screwing the nuts 15 to the stud bolts 116.

In this case, when another not-illustrated device (peripheral structures and the like) exists around the valve device 101, the valve seat processing machine 1 is installed in consideration of workability and interference with the other device. Since the base portion 10 is provided with as many bolt through holes 14 as the stud bolts 116 at the same pitch as the stud bolts 116, the attachment direction of the valve seat processing machine 1 (base portion 10) relative to the valve device 101 (direction in which the rectangular portion 12 is located) can be set to any of various directions. Accordingly, the valve seat processing machine 1 can be installed in consideration of workability and interference with the other not-illustrated device (see FIG. 1).

Next, the position (X-axis direction position and Y-axis direction position) in the horizontal plane and tilt of the main body portion 20 relative to the base portion 10 are adjusted. Specifically, the X-axis direction position and the Y-axis direction position of the main body portion 20 relative to the base portion 10 are adjusted by using the X-axis direction position adjustment bolts 18 and the Y-axis direction position adjustment bolts 19 (see FIGS. 1 and 2), and the tilt of the main body portion 20 relative to the base portion 10 (tilt of the main spindle 40 relative to the vertical direction) is adjusted by lifting the main body portion 20 with the lifting bolts 26 and inserting the not-illustrated height adjustment liner (see FIGS. 1 and 4).

In this case, for example, the adjustment amounts of the X-axis direction position, Y-axis direction position, and tilt of the main body portion 20 can be obtained based on measurement data obtained by attaching not-illustrated dial gages to two different positions of the main spindle 40 in the axial direction (up-down direction in FIG. 2) thereof and pressing the dial gages against the inner peripheries of the valve seat 118 and the third opening portion 113 in the valve body portion 110 of the valve device 101.

Next, the main body portion 20 is fixed to the base portion 10. Specifically, as illustrated in FIG. 3, the main body portion 20 is fixed to the base portion 10 by installing the liners 22 near the flanges 21 in the main body portion 20 and holding down the flanges 21 and the liners 22 with the hold-down fittings 23 and the bolts 24.

Next, the anti-vibration ring 41 provided on the main spindle 40 is fixed to the inside of the third opening portion 113. Specifically, the anti-vibration ring 41 engaged with the main spindle 40 is moved in the axial direction (up-down direction in FIG. 2) to be set at a location of the third opening portion 113 and the protruding bolts 41b are adjusted to fix the anti-vibration ring 41 to the inside of the third opening portion 113 (see FIGS. 2 and 5).

Preparation for the repair processing of the valve seat 118, that is, installation of the valve seat processing machine 1 to the valve device 101 (valve body portion 110) is completed by the work described above.

Next, the repair processing of the valve device 101 by the valve seat processing machine 1 is performed.

Figure 6:
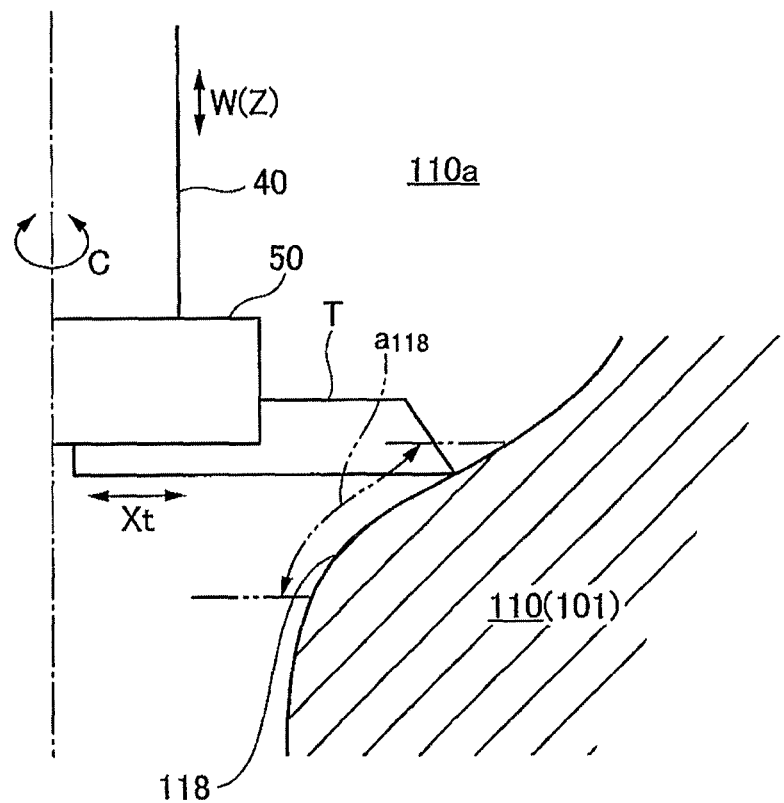
FIG. 6 is an explanatory view illustrating a processing method of a valve seat using the valve seat processing machine in Embodiment 1.

First, as illustrated in FIG. 6, the main spindle 40 is rotationally driven with the tool holder 50 holding the cutting tool T, the support portion 30 is moved in the Z-axis direction (or the main spindle 40 is moved in the W-axis direction), and the tool holder 50 is moved in the Xt-axis direction to cut an area $a_{118}$ of the valve seat 118. In this case, the support portion 30 (or the main spindle 40) and the tool holder 50 are moved such that an eroded portion of the valve seat 118 can be removed.

The valve seat 118 can be subjected to repair processing and formed into a shape corresponding to the valve element 124, by causing the NC device 60 to operate the tool holder 50 (cutting tool T) and perform cutting (NC processing) of the area $a_{181}$ in the valve seat 181 as described above.

As described above, the repair processing of the valve seat 118 can be easily performed with the valve device 101 (valve body portion 110) attached to the not-illustrated boiler and the not-illustrated steam turbine.

EXPLANATION OF THE REFERENCE NUMERALS 1 valve seat processing machine
10 base portion of valve seat processing machine
11 circular portion
12 rectangular portion
13 main spindle through hole
14 bolt through hole
15 nut
16 protruding portion
17 protruding portion
18 X-axis direction position adjustment bolt
19 Y-axis direction position adjustment bolt
20 main body portion of valve seat processing machine
21 flange
22 liner
23 hold-down fitting
24 bolt
25 screw hole
26 lifting bolt (pressing means) support portion of valve seat processing machine
40 main spindle of valve seat processing machine
41 anti-vibration ring (ring member)
41a ring portion of anti-vibration ring
41b protruding bolt of anti-vibration ring
50 tool holder
60 NC device
101 valve device
110 valve body portion
110a flow passage
111 first opening portion
112 second opening portion
113 third opening portion
114 upper surface
115 bolt hole
116 stud bolt
117 nut
118 valve seat
120 valve drive portion
121 attachment plate
122 drive portion main body
123 valve stem
124 valve element
125 valve stem insertion hole
126 bolt insertion hole

The invention claimed is:

1. A valve seat processing machine configured to process a valve seat in a valve device including a valve body portion which defines a flow passage of fluid and a valve drive portion which is detachably positioned on the valve body portion and which is configured to open and close the flow passage by driving a valve element capable of engaging with the valve seat in the valve body portion, the valve seat processing machine comprising:

a base portion configured to be attached to the valve body portion;

a main body portion on the base portion, the main body portion being movable relative to the base portion in two different axial directions;

a support portion on the main body portion, the support portion being movable relative to the main body portion in a drive direction of the valve element;

a main spindle on the support portion, the main spindle being rotatable relative to the support portion about an axis parallel to the drive direction of the valve element;

a tool holding device on the main spindle, the tool holding device being configured to hold a cutting tool for processing the valve seat, and being movable relative to the main spindle in a direction intersecting the drive direction of the valve element;

a controller configured to perform control of moving the support portion or the main spindle in the drive direction of the valve element and to perform control of moving the tool holding device relative to the main spindle in the direction intersecting the drive direction of the valve element; and a ring member rotatably attached to an outer periphery of the main spindle and fixable to the valve body portion, wherein the main body portion includes a pressing device for pressing the base portion to form a gap between the main body portion and the base portion from a state in which the main body portion and the base portion are in contact with each other.

2. The valve seat processing machine according to claim 1, wherein the base portion has as many bolt insertion holes as existing bolt holes defined in the valve body portion, the bolt insertion holes being defined at a same pitch as the existing bolt holes.

3. A valve seat processing method of processing a valve seat in a valve device including a valve body portion which defines a flow passage of fluid and a valve drive portion which is detachably positioned on the valve body portion and which is configured to open and close the flow passage by driving a valve element capable of engaging with the valve seat in the valve body portion, the valve seat processing method comprising:

processing the valve seat into a shape corresponding to the valve element by removing the valve drive portion from the valve body portion;

attaching the valve seat processing machine according to claim 1 to the valve body portion;

attaching the cutting tool to the tool holding device;

moving the support portion in the drive direction of the valve element; and moving the tool holding device in the direction intersecting the drive direction of the valve element.

* * * * *